United States Patent
Li et al.

(10) Patent No.: US 6,687,227 B1
(45) Date of Patent: Feb. 3, 2004

(54) SYSTEMS AND METHODS FOR REQUESTING PACKETS FOR TRANSMISSION OVER A WIRLESS CHANNEL HAVING A DYNAMICALLY CHANGING CAPACITY DUE TO A HIGHLY VARIBALE DELAY

(75) Inventors: Yalun Li, Ottawa (CA); Carl F. Cao, Nepean (CA); Leslie K. Brost, Calgary (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/523,697

(22) Filed: Mar. 13, 2000

(51) Int. Cl.⁷ ................................................. H04L 1/00
(52) U.S. Cl. ....................... 370/231; 370/236; 370/349; 370/401
(58) Field of Search ................................. 370/230, 231, 370/232, 234, 236, 238, 252, 253, 349, 401, 412, 413, 419, 516, 519

(56) References Cited

U.S. PATENT DOCUMENTS

| | | | | |
|---|---|---|---|---|
| 6,038,216 A | * | 3/2000 | Packer ........................ | 370/231 |
| 6,115,357 A | * | 9/2000 | Packer et al. ................ | 370/231 |
| 6,201,791 B1 | * | 3/2001 | Bournas ...................... | 370/234 |
| 6,205,120 B1 | * | 3/2001 | Packer et al. ................ | 370/235 |
| 6,208,620 B1 | * | 3/2001 | Sen et al. .................... | 370/231 |
| 6,219,713 B1 | * | 4/2001 | Ruutu et al. ................. | 709/235 |
| 6,370,114 B1 | * | 4/2002 | Gullicksen et al. .......... | 370/229 |
| 6,438,101 B1 | * | 8/2002 | Kalampoukas et al. ..... | 370/229 |

OTHER PUBLICATIONS

"A Comparison of Mechanisms for Improving TCP Performance over Wireless Links", Hari Balarishnan, *Student Member, IEEE,* Venkata N. Padmanabhan, *Student Member, IEEE,* Srinivasan Seshan, and Randy H. Katz, *Fellow, IEEE,* IEEE/ACM Transactions on Networking, vol. 5, No. 6, Dec. 1997, pp. 756–769.

"Explicit Window Adaptation: A Method to Enhance TCP Performance", Lampros Kalampoukas, et al, 1998, IEEE, pp. 242–251.

"I–TCP: Indirect TCP for Mobile Hosts", Ajay Bakre, et al, Department of Computer Science, Rutgers University, Piscataway, NJ 08855, 1995 IEEE, pp. 136–143.

"Improving End–to–End Performance of TCP Using Link–Layer Retransmissions over Mobile Internetworks", Jackson W.K. Wong and Victor C.M. Leung, Department of Electrical and Computer Engineering, The University of British Columbia, 2356 Main Mall, Vancouver, B.C., Canada, V6T 1Z4, 1999 IEEE. pp. 324–328.

"Performance of TCP on Wireless Fading Links with Memory*", A. Chockalingam, et al, Qualcomm, Inc., 6455 Lusk Boulevard, San Diego, CA 92121–2779, U.S.A., Department of Electrical and Computer Engineering, University of California at San Diego, La Jolla, CA 92093–0407, U.S.A., 1998 IEEE, pp. 595–600.

* cited by examiner

*Primary Examiner*—Hassan Kizou
*Assistant Examiner*—Christopher M Swickhamer

(57) ABSTRACT

Systems and methods which allow the under-utilization of high-speed radio channels to be reduced significantly are provided which feature packet buffering and buffer management for a specific link segment of the end-to-end TCP connection. Dynamic rate control (DRC) is performed in a manner which transparently uses the advertised receiver window size mechanism provided within TCP, to maintain a steady stream of packets to be transported onto a long and variable delay high-speed channel. A queue is managed by dynamically relating the current size of the queue to the amount of incoming data by enlarging or shrinking the client advertised window size to the predicted buffer growth. DRC does not perform end-to-end flow control, but rather it supplements this function of TCP. The invention may be implemented as an agent of TCP in the sense that it is hidden in the middle of the network.

23 Claims, 7 Drawing Sheets

DELAY CHARACTERISTIC FOR WIRE-LINE HOST-
MOBILE HOST CONNECTION

SYSTEMS AND METHODS FOR REQUESTING PACKETS FOR TRANSMISSION OVER A WIRLESS CHANNEL HAVING A DYNAMICALLY CHANGING CAPACITY DUE TO A HIGHLY VARIBALE DELAY

FIELD OF THE INVENTION

The invention relates to channel utilization enhancements for long and variable delay channels, such as channel utilization enhancements for TCP (Transport Control Protocol) over high-speed wireless channels.

BACKGROUND OF THE INVENTION

The utilization of a channel, for example during a bulk data transfer, is determined by the balance between the capacity of the channel and the amount of data available to feed into that channel. This balance needs to be managed. If the balance is in favor of the capacity, under-utilization occurs. If the balance is in favor of the amount of data put in transit, optimal utilization is achieved. However, for channels with a variable capacity, there will be excessive packets that may have to be either buffered or dropped, as they will not be accommodated by the transmission channel when the capacity shrinks periodically.

This is particularly true for high-speed third generation (3G) wireless communications systems where one of the major issues in effectively transporting packet data using Internet protocols such as TCP/IP (Transport Control Protocol/Internet Protocol) is such an under-utilization of allocated high-speed radio channels. This is a significant issue since such radio channels are scarce resources due to the fundamental limit on the available radio spectrum. In high-speed 3G wireless environments, a high-speed channel results in a larger bandwidth delay product which is enlarged further by the length and variable delay characteristics of such channels.

The channel capacity of a TCP connection is the product of channel bandwidth and the round trip delay and is a measure of the volume of the "pipe" between the end-hosts. A longer round trip delay increases the capacity and therefore will demand more data onto the channel such that the pipe can be filled. A higher channel speed also allows the channel to accommodate more packets, and will also require the server host to send data more quickly as the pipe empties faster. When a link has long and variable delay the channel capacity will increase, and will also be variable.

Over a wireless link, high error rates may exist (compared with those on fixed wire-line links) and despite various coding techniques these error rates may still translate into a high radio frame erasure rate (typically, 10%), which in turn translates into more than a 10% packet loss for data transfer rates of 64–144–384 kbps. For this reason, link layer retransmissions are employed to compensate for this high frame erasure rate. Typically an Automatic Repeat Request (ARQ) based method is used such as RLP-III (Radio Link Protocol-III). These retransmissions of course contribute to the size and variability of the delay. There is an accumulative delay per retransmission as the frame is inserted into the current transmission stream. Furthermore, a lost frame cannot be released to upper layers until it is retransmitted correctly. If the retransmission protocol provides in-order data delivery, frames will be put off on the receiving side by the lost frame in front of them. These frames will have to wait for the correct retransmission before being released. The residual frame error may be reduced, e.g., to below 0.2% with 2–4 retransmissions for a resulting packet loss of around 1%. These retransmissions extend the one-way delay by 160–320 ms. Such delays only occur when the initial frame is lost, they are variable to TCP/IP, and are proportional to the frame error rate of the link.

These delays will interact with TCP to produce a number of effects with the end result that under-utilization of the channel occurs. Firstly, retransmissions will delay the forwarding of effected packets to the TCP/IP layers. Retransmissions will also push back all the packets closely following each effected packet during the retransmission. Secondly, the corresponding TCP client-to-server direction acknowledgements for all the effected packets will experience delay. The server will wait for the duration of the delay before sending data because TCP uses these acknowledgements to regulate the data flow from the server to the client. Thirdly, if the acknowledgements do not arrive at the TCP server host, it will not transmit new data onto the channel, creating periods of idling of the channel. This will result in under-utilization and also stretch the overall TCP session time. Fourthly, delayed acknowledgement implementation of TCP and possible loss and retransmission of acknowledgements in the client-to-server direction will also contribute to under-utilization.

FIG. 1 illustrates an example delay characteristic experienced by packets to be sent between a wire-line end-host 10 and a mobile end-host 12. The plot shows a relatively stable delay region 14 for a wire-line portion of the link, and a variable delay region 16 shown by the fluctuating plot lines for a wireless portion of the link.

The impact of stable delay on utilization will be described with reference to FIG. 2 so that it may be contrasted with the impact of variable delay which is described below with reference to FIG. 3. A TCP end-to-end packet flow pattern is plotted in FIG. 2 where the round trip delay is stable for example for communication between a first wire-line host 10 and a second wire-line host 18. After TCP completes slow-start, the congestion window and the received advertised window size limits the server to send data in packet bunches corresponding to the size of the client advertised window size. Given a large enough delay of the channel or a high channel speed, TCP utilization of the channel will degrade.

The operations of TCP proceed as follows. Assuming TCP flow control has completed slow-start, the first wire-line host 10 fills in the channel with the maximum number of packets allowed by the minimum of congestion window, the received advertised window size, and the sender's retransmission buffer size. It will wait for the first client-to-server direction ACK packet to come back from the second wire-line host 18 before sending more data. The waiting period becomes one of the root causes of channel under-utilization as soon as synchronization between the number of packets sent and the round trip delay is disrupted. In FIG. 2, t is the size of the packet in time; T is the round trip time of the channel from the time the first of the packets is sent until the corresponding ACK is received; n is the number of packets that will be sent as dictated by the smallest of the congestion window size, the received advertised window size, and the sender's buffer size. For the channel to be fully utilized to the total of the bandwidth and delay product, the following equation must hold: $T \geq n \cdot t$.

When $T > n \cdot t$, there is an idle time; "I" in the radio channel. I equates to the time between when the current full window of packets have been transmitted and the next window of packets triggered by the reception of ACKs for those packets. As this pattern of packet transmission is repeated the overall channel utilization is reduced by $I=T-n \cdot t$, or as a percentage of reduced utilization $U=(T-n \cdot t)/T$. The relationship of T and t can be illustrated by the relative difference between channel speed and the overall delay. With a $T>>t$, which can be either interpreted as long delay of the network, or high data rate channel, even a large n will still cause an idle time I. $n=T/t$ can be achieved by enlarging the joint effect of the TCP congestion window, the received advertised window size, and the sender's buffer size. With a higher channel speed (and/or longer overall network delay), a larger n is required to reduce I, thus to achieve a lower U. For such a channel, an $n_1$ can be calculated such that if applied, it can allow TCP flow control to fill in the idle time I of the channel and increase utilization to (near) the optimum.

The impact of variable delay will be described with reference to FIG. 3. As stated previously, variable delay can be caused by link layer retransmissions. For high speed 3G wireless channels, a higher frame error rate is expected. The link layer will retransmit the lost frames both in client-to-server and server-to-client directions. It may take several round trip times across the wireless channel to retransmit a lost frame, each of which adds delay. As these retransmission delays occur only for frames that are effected, these delays are variable proportionally to the frame erasure rate of the link. Regardless of how the variable delay may be caused, TCP will interact with these variable delays. Similar to FIG. 2, there will be an idle time $I_1$ in the event $T_1>n \cdot t$ if it is indeed the case as in FIG. 3 representing the stable component of the delay. $V_2$ and $V_3$ are variable delays in the server-to-client direction and client-to-server direction respectively. Now the round trip delay for the variable delay channel is $T_2=T_1+V_2+V_3$ which is increased and is no longer a (near) constant, resulting in a different idle time $I_2=I_1+V_2+V_3$. Therefore for the delay of $T_2$ a different $n_2$ will have to be applied for optimal utilization. This situation will be much more complex as the adjustment of n will have to be dynamic as a function of the changing T.

Techniques such as "explicit window adaptation" algorithms have been proposed to reduce the amount of data available for transmission. They reduce the TCP received advertised window size, but do not maintain their own buffer. They suppress the amount of data from the TCP server host. Although they are effective when a network node is experiencing congestion, they may actually be harmful when the problem is channel under-utilization.

Techniques using various TCP proxies exist which split a TCP connection. These proxies terminate the TCP connection from one end-host and originate a separate connection to the other host. The second TCP connection may be optimized for particular link such as the wireless channel. This breaks the TCP end-to-end semantics in that a packet may be acknowledged before the end-host has actually received it.

Some methods simply enlarge the absolute size of the TCP receiver buffer. Enlarging the receiver buffer can allow TCP to send more data onto the channel. However, these methods will require modifications to the TCP/IP protocol stack, the OS, or the application configurations on TCP end-hosts. Furthermore, as packets converge to a relatively small and frequently variable channel, packets may have to be dropped or buffered.

SUMMARY OF THE INVENTION

It is an object of the invention to obviate or mitigate one or more of the above-identified disadvantages.

The invention provides systems and methods which allow the under-utilization of high-speed radio channels to be reduced significantly. Advantageously, there is only a small associated cost, and only a small increase in processing power and buffer space in the radio access network infrastructure.

Embodiments of the invention provide various dynamic rate control (DRC) systems and methods through packet queuing and queue management for a specific link segment of the end-to-end connection. In TCP embodiments, DRC may transparently use the client advertised window size mechanism provided within TCP to maintain a steady stream of packets to be transported onto a channel having a dynamically changing capacity due to a highly variable delay.

DRC provides for a steady, but not excessive amount of packets in its queue. This queue is managed by dynamically relating the current size of the queue to the amount of incoming data by enlarging or shrinking the client advertised window size to the predicted queue growth.

DRC does not perform end-to-end flow control, but rather it supplements this function of TCP. The invention may be implemented as an agent of TCP in the sense that it is hidden in the middle of the network. While various flavors of TCP adapt to the end-to-end conditions of the packet flow, the invention enhances this by adapting to the conditions of a particular link segment, e.g., a high-speed 3G wireless channel. In performing this function, DRC requires no changes or enhancements to current TCP/IP protocols; it can co-operate with all TCP/IP flavors.

DRC may be implemented in a manner which avoids end-host modifications by managing packet queuing in the middle of the end-to-end TCP connection and still achieves the improvement in utilization. To the extent that DRC is able to maintain the packet queue efficiently it does not need to drop packets. In this regard it differs from the previously discussed solutions in which the receive buffer is simply enlarged.

DRC maintains the integrity of the end-to-end TCP connection, and maintains TCP semantics in that it will not acknowledge a packet until the receiver acknowledges it. In this regard, it differs from the previously discussed TCP proxy solutions which split a TCP connection into two parts.

According to one broad aspect, the invention provides a method of requesting packets from a first end-point for transmission to a second end-point over a first channel followed by a second channel which is a wireless channel having a dynamically changing capacity due to a highly variable delay. The method is implemented at an interface between the first and second channels. Packets received on the first channel are queued in a queue having a queue length equal to the number of packets queued, and are dequeued onto the second channel as capacity of the second channel permits. An estimate is made which is directly or indirectly representative of the instantaneous capacity of the second channel. As a function of the queue length and the estimate, transmissions are requested from the first end-point in a manner which avoids the queue becoming empty when the first end-point still has further packets to transmit.

The invention may be applied in the context of an end-to-end packet delivery system in which the first end-host is permitted to send packets as a function of a window size specified in acknowledgement packets it receives. In this case the method further includes receiving acknowledgement packets over the second channel. For each acknowledgement packet received, an original window size specified in the acknowledgement packet received is extracted, a new window size is calculated as a function of the queue length, the estimate and the window size, and a new acknowledgement packet is generated which is substantially the same as the acknowledgement packet received except that the new window size has been substituted in place of the original window size. Packet transmissions from the first end-point are then requested by forwarding the acknowledgement packet on the first channel.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
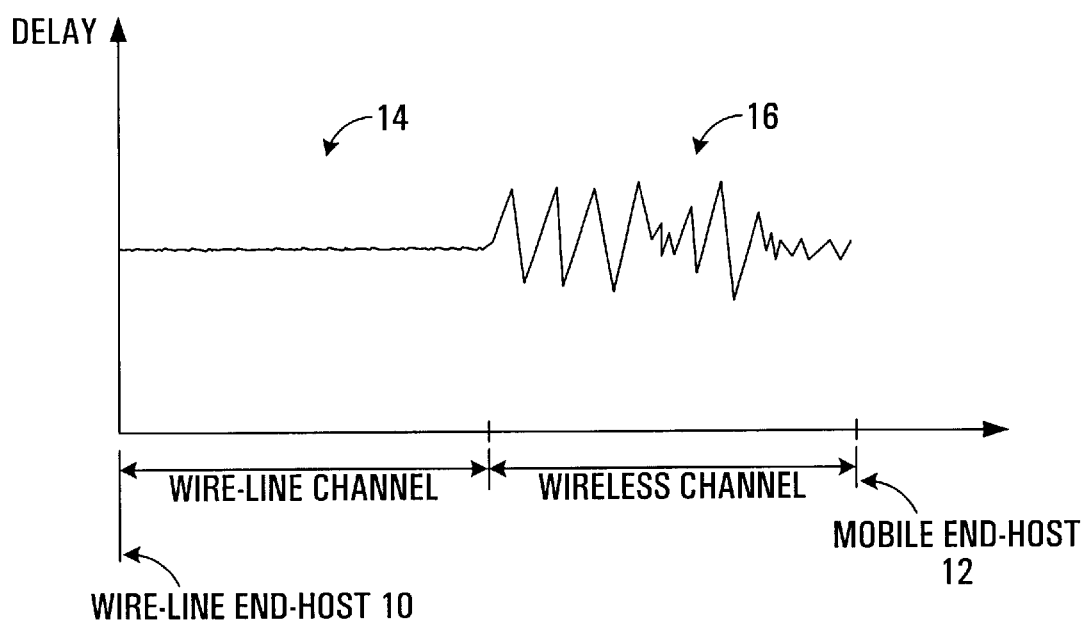
FIG. 1 is a plot of the delay characteristic for a wire-line host to mobile host connection.
Figure 2:
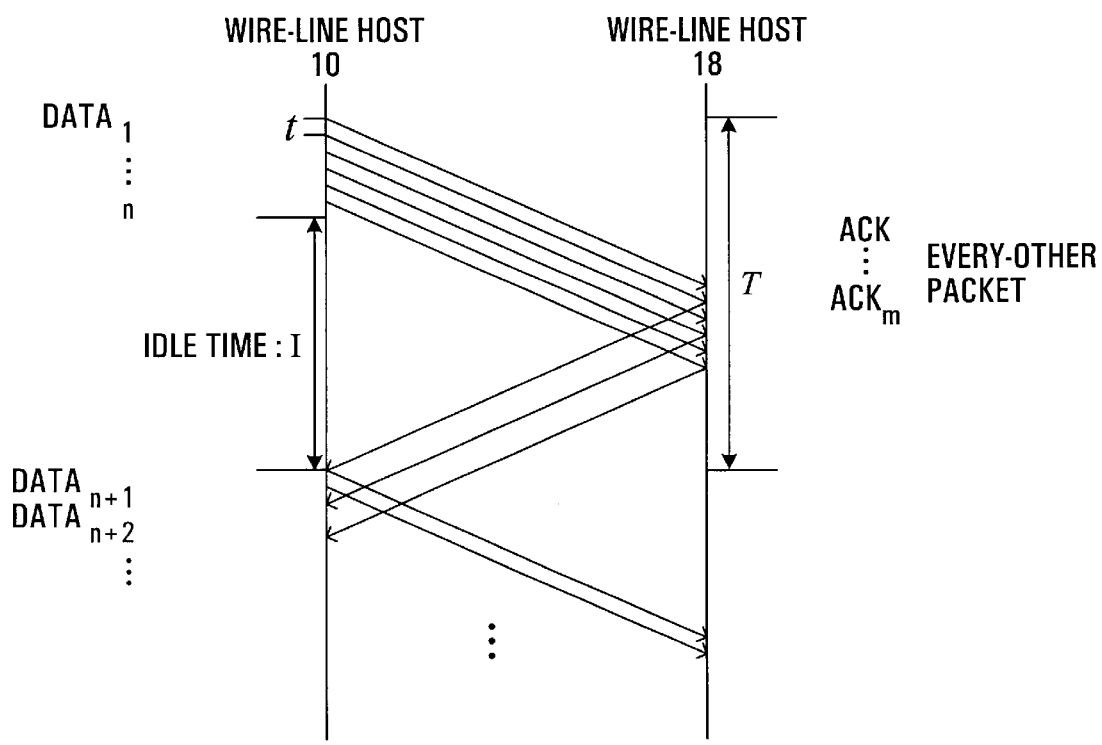
FIG. 2 is a timing diagram illustrating how channel under-utilization occurs when there is a stable delay between a wire-line host and another wire-line host.
Figure 3:
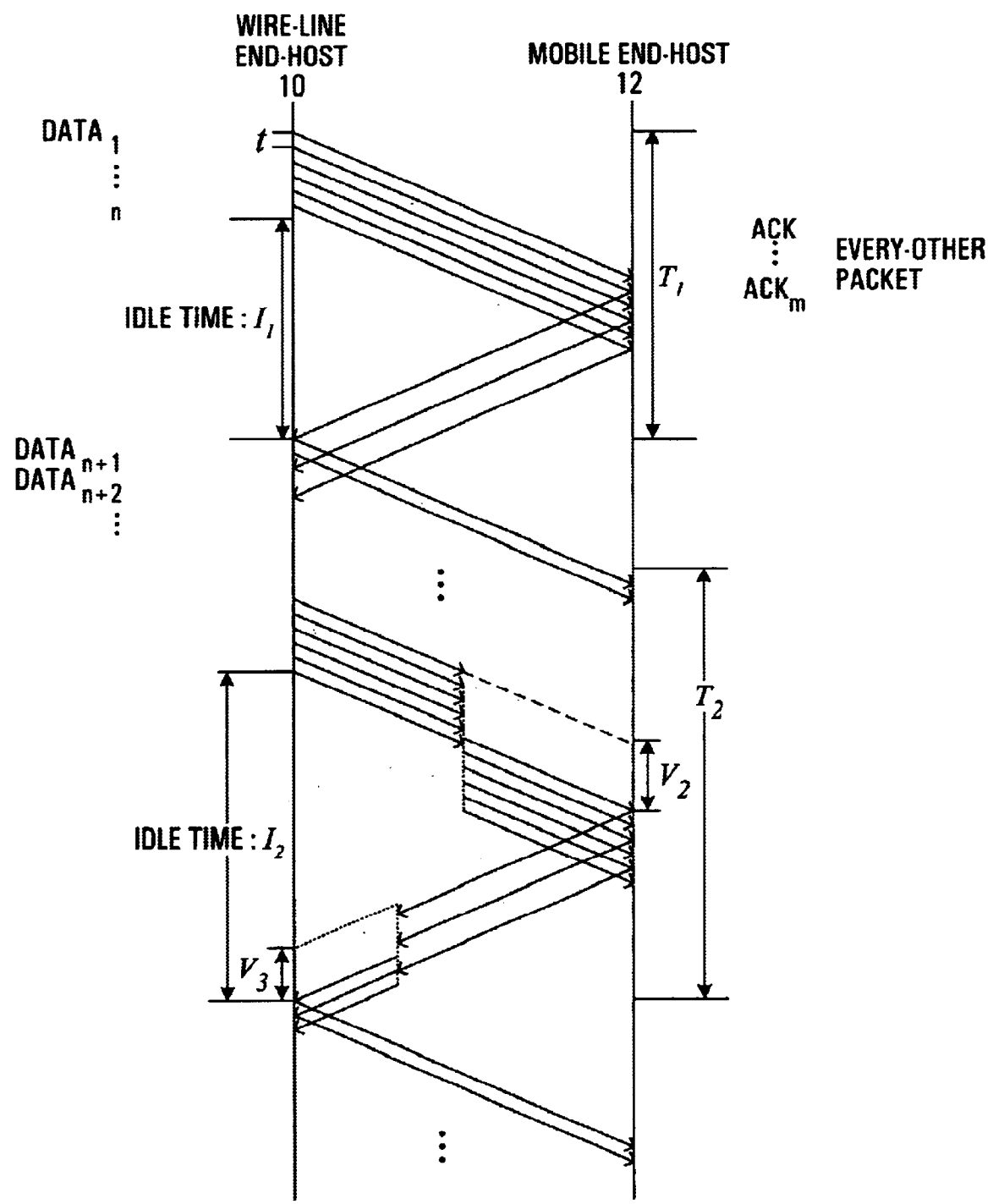
FIG. 3 is a timing diagram illustrating how further channel under-utilization occurs when there is a long and variable delay between a wire-line host and a mobile host.
Figure 4:
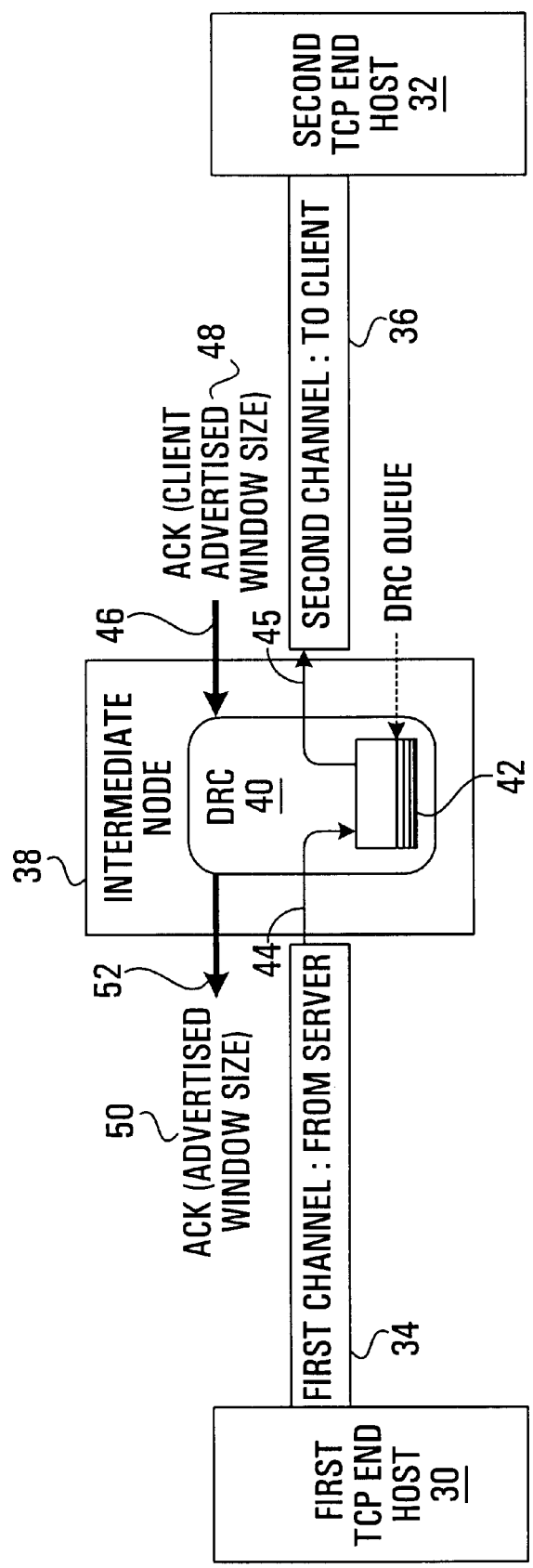
FIG. 4 is a block diagram of a TCP connection featuring an intermediate node running a dynamic rate controller according to an embodiment of the invention.

Referring to FIG. 4, a TCP packet flow which might be a bulk data transfer is shown between a first TCP end-host 30, which might be a server for example, to a second TCP end-host 32. The transmission path between the two end-hosts 30,32 includes a first channel 34 which is a high speed link such as one or a combination or sequence of wire-line links, and a second channel 36 which is slower, but still high speed, such as a wireless channel. Transfer from the first channel 34 to the second channel 36 is performed by an intermediate node 38 equipped with a DRC (dynamic rate controller) 40 in accordance with an embodiment of the invention. The first channel 34 has a relatively stable delay, while the second channel 36 has a dynamically varying capacity due to a highly variable delay, particularly with respect to the stability of the delay of the first channel 34. The DRC 40 has a DRC queue 42 into which packets 44 from the first channel 34 are queued and from which they are de-queued 45 for transmission on the second channel 36 on a first-in-first-out basis. The intermediate node 38, and more particularly the DRC 40, receives acknowledgements 46 from the second end-host 32 acknowledging successfully delivered packets. Each such acknowledgement contains a CWS (client advertised window size) 48 in accordance with TCP. Before passing on the acknowledgement upstream to the first end-host 30, the DRC 40 examines the CWS 48, the state of the DRC queue 42 (how full it is), generates a revised AWS (advertised window size) 50 which is a function of these values, and generates acknowledgements 52 with the CWS replaced with this AWS as described in detail below.

In the absence of the DRC 40, the amount of data that may be fed into the second channel 36 is controlled by the minimum of the TCP congestion window size on the first end-host 30, the first end-host's 30 send buffer size and the TCP advertised window size from the second end-host 32. The capacity of the second channel 36 is determined by its bandwidth and the round trip link delay. When the bandwidth is high and/or the link delay is long, the capacity of the second channel 36 may exceed the CWS so as to limit data transmission on the second channel 36. Furthermore, when the link delay is long and varies with a certain frequency, this transmission limit occurs periodically in relation to the variability of the delay.

The DRC 40 dynamically controls the rate at which packets flow from the first channel 34 onto the second channel 36. It instructs the first end-host 30 to send more when the capacity of the second channel 36 is larger due to increased delay and less when the capacity is smaller due to decreased delay. It manages the DRC queue 42 of packets such that this queue is non-zero at any time for data to be available to be transmitted over the second channel 36.

The DRC 40 achieves this by intercepting TCP acknowledgements (ACKs) 46 from the second end-host 32 to the first end-host 30, by dynamically reconfiguring the intercepted CWS contained in the acknowledgements to equal the new AWS 50 and then forwarding the modified acknowledgements. The new AWS 50 will limit or encourage the packet flow from the first end-host 30 such that it maintains the DRC queue 42 with sufficient packets to overcome under-utilization while not overflowing the queue 42.

Figure 5A:
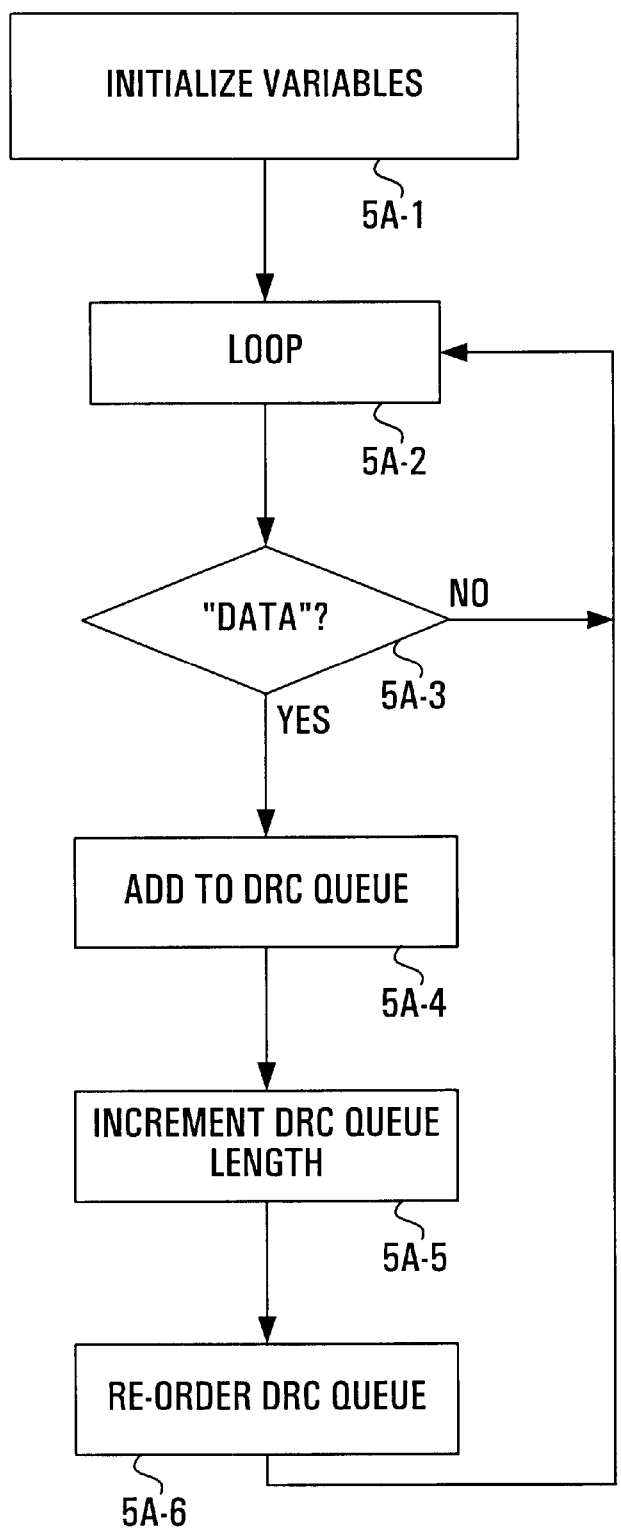
FIGS. 5A, 5B, and 5C are flowcharts for the operation of the dynamic rate controller of FIG. 4.
Figure 5B:
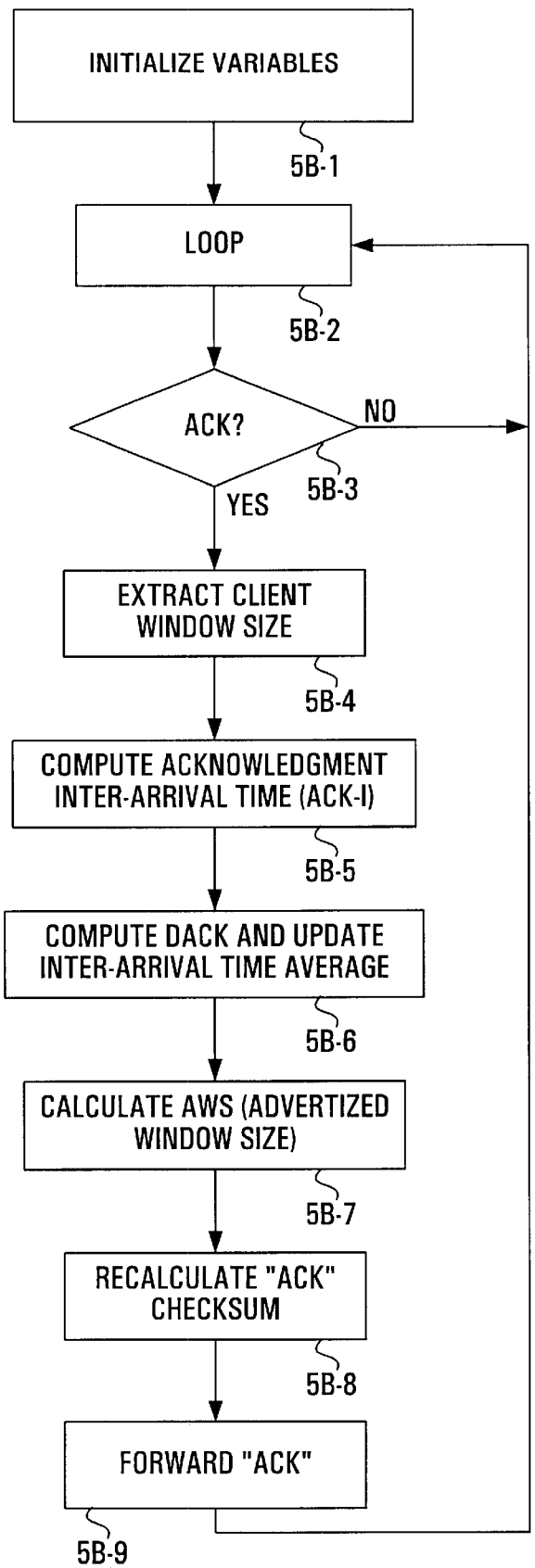
Figure 5C:
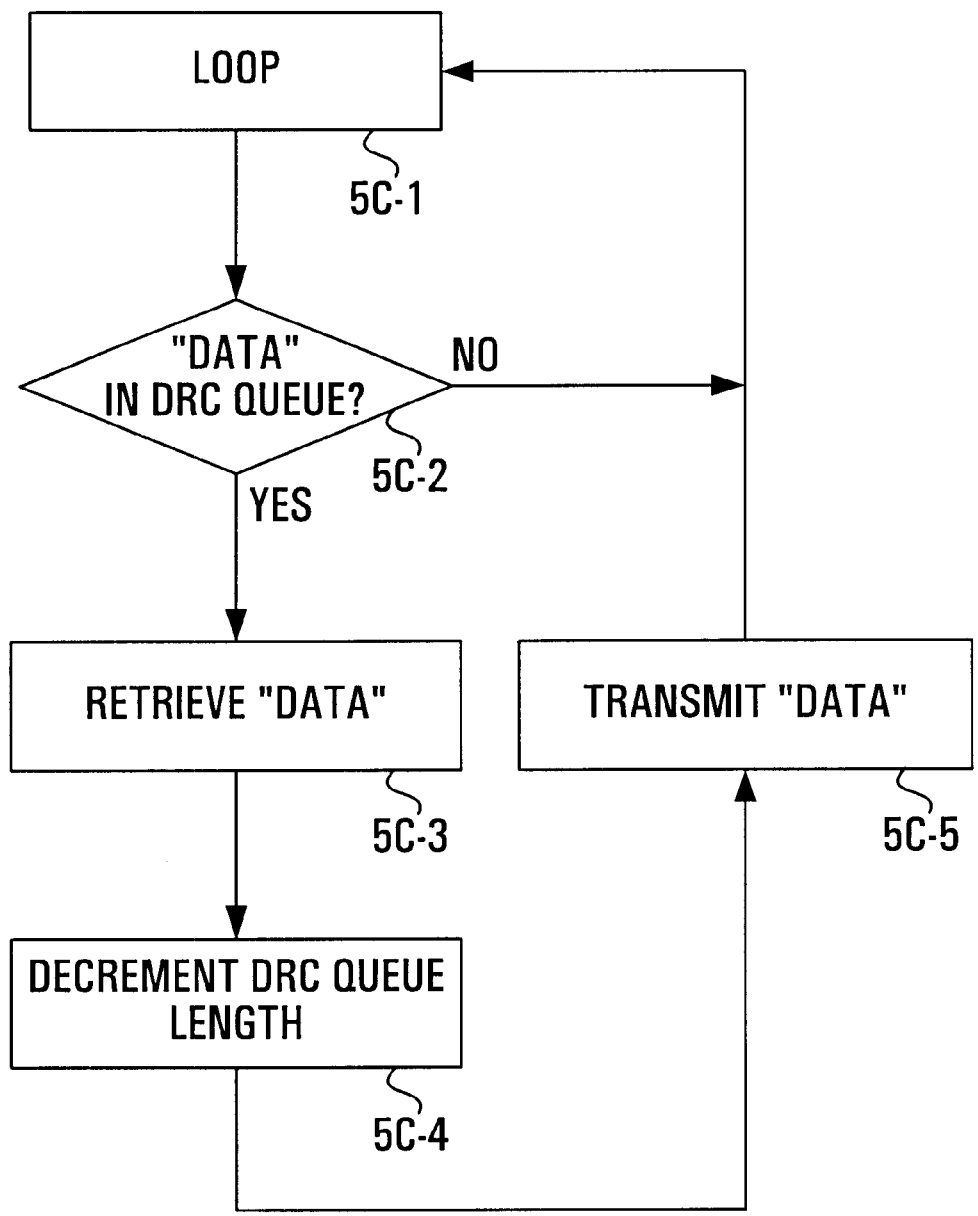

FIG. 5 illustrates the functionality of the DRC 40 divided up into three procedures shown in FIGS. 5A, 5B and 5C respectively. The first procedure (FIG. 5A) loops forever (step 5A-2) after initializing internal variables (step 5A-1), and waits to receive packets from the first channel for transmission on the second channel. Data packets are received (yes path, step 5A-3), and added to the DRC queue (step 5A-4). The DRC queue length (DQL) is incremented (step 5A-5), and the DRC queue is re-ordered (step 5A-6) to maintain TCP sequencing.

The second procedure (FIG. 5B) loops forever (step 5B-2) after initializing (step 5B-1) and waits for acknowledgements received (yes path, step 5B-3) over the second channel for transmission over the first channel. The client window size field is extracted (step 5B-4), and the inter-arrival time ACK-I from the previously received acknowledgement is computed (step 5B-5). The difference DACK between ACK-I and the previous inter-arrival time average is computed, and the average inter-arrival time is updated (step 5B-6). A new AWS is calculated (step 5B-7) by the function: AWS=f(CWS,DQL,DACK) where CWS is the extracted client window size, DQL is the current length of the DRC queue, and DACK is the difference of inter-arrival time of this ACK from the previous average. A modified ACK checksum is recalculated (step 5B-8) and packaged into a valid ACK packet and the repackaged ACK is replaced on the client-to-server direction transmission channel (step 5B-9).

The third procedure (FIG. 5C) handles the dequeueing of packets from the DRC queue for transmission on the second channel. This procedure loops forever (step 5C-1) retrieves data packets (yes path, step 5C-2, step 5C-3) from the DRC queue, decrements the DRC queue length variable (step 5C-4), and places the packets onto the transmission channel (step 5C-5).

Referring again to FIG. 4, it takes a one way delay for an ACK with the advertised window size to arrive at the first end-host 30, and takes another one way delay for data with new rate to arrive at the DRC 40. Therefore, the DRC 40 cannot control the server's sending speed in real time. As the round trip delay changes dynamically, the DRC 40 cannot predict its values down the road and also cannot modify the advertised window size 50 based on the current value of T.

The task is to determine the AWS 50 which ensures that there is enough data available in the DRC queue 42 ready to be transmitted onto the second channel 36. The number of packets queued is a good indicator to increase or decrease the sender's data rate. The size of the advertised window size 50 is preferably determined by the linear function:

$$AWS(bytes)=f(CWS, DQL, DACK)=\alpha CWS+\beta/(DQL+1)+\delta DACK$$

where $\alpha$, $\beta$, $\delta$ are parameters of the function. Stating it another way with the meaning of the various terms spelled out:

advertised window size=$\alpha$ (client advertised window size)+$\beta$/(number of packets in queue+1)+$\delta$(Difference between most recent acknowledgement inter-arrival time and average inter-arrival time).

$\alpha$CWS represents the minimum advertised window size which the equation should produce. This should equal the smallest total channel capacity which may result, i.e. the product of the channel rate and the shortest channel delay. It is representative of the capacity of the second end-host to receive data. It will go down when the second end-host is queuing packets which are out of order. CWS is of course reflective of the rate which would result in the absence of DRC. More generally, the advertised window size should be an increasing function of the capacity for the second host to receive data.

In the above, $\beta/(DQL+1)$ controls the effect of the queue length on the advertised window size. As the queue length gets longer, this component will get smaller, and similarly, as the queue length gets smaller, this component will get larger. The advertised window size 50 is inversely proportional to the length of the DRC queue in this function. The result is that the first end-host 30 is requested to inject more data if fewer data packets are queued. Otherwise the first end-host 30 should reduce the number of packets sent to keep the queue length at a reasonable size. More generally, the advertised window size should be a decreasing function of the DRC queue length.

The advertised window size 50 is an increasing function of the increase in the inter-arrival time of ACKs. Channel conditions such as burst errors will be reflected in the interval between ACK packets. Frame loss (for both data and acknowledgements) and the resulting retransmission will postpone the arrival of ACKs. The longer this delay, the larger the advertised window size should be. $\delta$ DACK is a component representative of the wireless channel delay which is of course proportional to capacity. As the delay gets larger, this component increases, and similarly, as the delay gets smaller this component decreases. More generally, the advertised window size 50 should be an increasing function directly or indirectly of the instantaneous capacity and/or delay and/or bandwidth delay product of the second channel 36.

The effect of the above equation for the advertised window size is to maintain the DRC queue 42 with available packets most of the time, so that the second channel 36 will be more fully utilized. For this purpose the parameters $\alpha$, $\beta$, $\delta$ should be optimized for a specific link in relation to the overall delay and the speed of the link and will be different for different network configurations.

For example, most systems would also have a maximum AWS constraint MAX(AWS), and the above equation may be implemented in the context of this constraint. Furthermore, individual clients may have a self imposed maximum CWS, MAX (CWS). For example, TCP specifies a MAX (AWS) of 64 kB and the MAX (CWS) might be 8 kB. The constraint AWS=f(CWS,DQL, DACK)=$\alpha$ MAX (CWS)+$\beta$/(DQL+1)+$\delta$ DACK<MAX (AWS) would need to be applied. Since $\delta$ DACK is typically small, and $\beta$/(DQL+1) has a maximum value of $\beta$, this constraint can be approximated as $\beta \leq$(MAX (AWS)-$\alpha$ MAX (CWS)). $\beta$ may be set to be the maximum value satisfying this constraint, i.e. $\beta$=MAX (AWS)-$\alpha$ MAX (CWS). $\beta$ should also be$\geq$sender's buffer size -$\alpha$ MAX (CWS). $\delta$ should be some value less than or equal to the second channel's raw data rate.

By way of example, a simulation was conducted for a sender in a Linux operating system with sender's buffer size 32 kB, and a receiver with a WIN95 platform with a default receiver buffer size (MAX (CWS)) of 8 kB, in which the parameters were configured as follows-: $\alpha$=1; $\beta$=40 kB (satisfying the constraints $\beta \leq \alpha$ (64 kB)-8 kB=56 kB and $\beta \geq$32 kB-8 kB=24 kB), and $\delta$=57 kB for a 460 kbps radio channel. The results show that for a 10% frame error rate 460 kbps radio channel running RLP to recover lost frames, the channel throughput increases from 35% with no DRC to about 70% with DRC, approximately a 100% throughput improvement.

The invention may be implemented in any intermediate node which performs the transfer of packets from the first channel to the second channel. More generally, it may be implemented using any processing platform and using any processing element and queue which itself may be implemented with the processing element. For example, a wireless access node with DRC functionality may be provided. It might be implemented in a microprocessor, a specific card, or on a specific digital signal processor or application specific integrated circuit.

Numerous modifications and variations of the present invention are possible in light of the above teachings. It is therefore to be understood that within the scope of the appended claims, the invention may be practiced otherwise than as specifically described herein.

The invention may be used with RLP-III over a wireless channel, and more generally the invention can be used with any link layer protocol. While TCP may be used as the upper-layer protocol, more generally any system employing end-to-end acknowledgements will benefit.

We claim:

1. A method of requesting packets from a first end-point for transmission to a second end-point over a first channel followed by a second channel which is a wireless channel having a dynamically changing capacity due to a highly variable delay, the method comprising at an interface between the first and second channels:

queuing packets received on the first channel in a queue having a queue length equal to the number of packets queued, and dequeueing them onto the second channel as capacity of the second channel permits;

making an estimate representative of the instantaneous capacity of the second channel;

as a function of the queue length and the estimate, requesting packet transmissions from the first end-point in a manner which avoids the queue becoming empty when the first end-point still has further packets to transmit.

2. A method according to claim 1 for application in the context of an end-to-end packet delivery system in which the first end-host is permitted to send packets as a function of a window size specified in acknowledgement packets it receives, the method further comprising:

receiving acknowledgement packets over the second channel;

for each acknowledgement packet received:
  extracting an original window size specified in the acknowledgement packet received;
  calculating a new window size as a function of the queue length, the estimate and the original window size;
  generating a new acknowledgement packet which is substantially the same as the acknowledgement packet received except that the new window size has been substituted in place of the original window size;
  requesting packet transmissions from the first end-point by forwarding the acknowledgement packet on the first channel.

3. A method according to claim 2 further comprising:
  determining as said estimate one or more acknowledgement frequency parameters representative of the rate at which acknowledgements are being received over the second channel.

4. A method according to claim 3 wherein determining one or more acknowledgement frequency parameters comprises:
  maintaining an average time between acknowledgement packets;
  determining a difference between a most recent time between acknowledgement packets and the average time between acknowledgement packets.

5. A method according to claim 4 wherein said new window size is computed according to:
  new window size=α (original window size)+β/(number of packets in queue+1)+δ(Difference between most recent acknowledgement inter-arrival time and average inter-arrival time) where α, β and δ are parameters.

6. A method according to claim 5 for use in the context of TCP/IP, where said acknowledgments are TCP acknowledgements.

7. A method according to claim 6 wherein said original window size is a TCP client advertised window size, and wherein said new window size is a TCP advertised window size.

8. A method according to claim 2 wherein said new window size is computed as an increasing function of the original window size, an increasing function of the instantaneous capacity of the second channel, and a decreasing function of the number of packets in the queue.

9. A method according to claim 2 for use in the context of TCP/IP, where said acknowledgments are TCP acknowledgements.

10. A method according to claim 9 wherein said original window size is a TCP client advertised window size, and wherein said new window size is a TCP advertised window size.

11. A method according to claim 1 for application in the context of an end-to-end packet delivery system in which the first end-host is permitted to send packets as a function of a window size specified in acknowledgement packets it receives, the method further comprising:
  determining as said estimate one or more acknowledgement frequency parameters representative of the rate at which acknowledgements are being received over the second channel.

12. A method according to claim 1 further comprising computing a number of packets to request as an increasing function of the instantaneous capacity on the second channel, and a decreasing function of the number of packets in the queue, wherein requesting packet transmissions from the first end-point comprises requesting said number of packets to request.

13. A method according to claim 1 for use in the context of TCP/IP (Transport Control Protocol/Internet Protocol), wherein requesting packet transmissions is done using a TCP (Transport Control Protocol) advertised window size mechanism.

14. A method according to claim 1 wherein there is an end-to-end acknowledgement protocol between the two end-hosts.

15. A method according to claim 14 wherein said second channel features a link layer ARQ (Automatic Repeat Request) protocol which functions below the level of the end-to-end acknowledgement protocol.

16. A method according to claim 15 wherein the link layer ARQ protocol is RLP-III (Radio Link Protocol-III).

17. An apparatus for requesting packets from a first end-point for transmission to a second end-point over a first channel followed by a second channel which is a wireless channel having a dynamically changing capacity due to a highly variable delay, the apparatus comprising a queue adapted to queue packets and having a queue length equal to the number of packets queued, and a processing element adapted to queue packets received on the first channel in the queue, and to dequeue them onto the second channel as capacity of the second channel permits, the processing element being further adapted to make an estimate representative of the instantaneous capacity of the second channel, and as a function of the queue length and the estimate, request packet transmissions from the first end-point in a manner which avoids the queue becoming empty when the first end-point still has further packets to transmit.

18. An intermediate node comprising the apparatus of claim 17.

19. A wireless access node comprising the apparatus of claim 17.

20. A digital signal processor comprising the apparatus of claim 17.

21. An application specific integrated circuit comprising the apparatus of claim 17.

22. A printed circuit card comprising the apparatus of claim 17.

23. An apparatus for requesting packets from a first end-point for transmission to a second end-point over a first channel followed by a second channel which is a wireless channel having a dynamically changing capacity due to a highly variable delay, the method comprising at an interface between the first and second channels:
  queuing means for queuing packets received on the first channel and for dequeueing them onto the second channel as capacity of the second channel permits;
  processing means for making an estimate representative of the instantaneous capacity of the second channel;
  packet transmission requesting means for, as a function of the queue length and the estimate, requesting packet transmissions from the first end-point in a manner which avoids the queue becoming empty when the first end-point still has further packets to transmit.

* * * * *

UNITED STATES PATENT AND TRADEMARK OFFICE
CERTIFICATE OF CORRECTION

PATENT NO. : 6,687,227 B1
DATED : February 3, 2004
INVENTOR(S) : Yalun Li et al.

It is certified that error appears in the above-identified patent and that said Letters Patent is hereby corrected as shown below:

Title page,
Item [54], Title, "...WIRLESS..." should be -- ...WIRELESS... -- and "...VARIBALE..." should be -- ...VARIABLE... --.

Column 10,
Line 49, "...method..." should be -- ...apparatus... --.

Signed and Sealed this

Twenty-second Day of March, 2005

JON W. DUDAS
*Director of the United States Patent and Trademark Office*